Patented Mar. 25, 1952

2,590,121

UNITED STATES PATENT OFFICE 2,590,121

PROCESS FOR THE PREPARATION OF LYSOZYME FROM ASS MILK

Dagoberto Molina Polo and Alfonso Guillermo Alarcon, Mexico City, Mexico

No Drawing. Application December 11, 1947, Serial No. 791,156

5 Claims. (Cl. 195—66)

This invention relates to an original process for the preparation of lysozyme from ass milk, to be used in the treatment of diseases caused by bacterial organisms.

Lysozyme since the first report published by Flemming in 1922, has been considered an enzyme with inhibiting and lytic properties over certain group of bacteria, such as *Micrococcus lysodeiktious* and other coccus. Said lysozyme has been found in almost all animal and vegetal tissues, and it has been found present in tears, pleural fluid, saliva, blood serum, etc., but the highest practical content has been found in egg white.

Investigations on the therapeutical properties of this lytic agent have reported favorable results in the treatment of ulcers of the eyes, post-operative infections, burns, sinusitis, infected wounds, and in certain cases of infections of the digestive tract.

Lysozyme obtained from egg white, which is the known source and process of purification, have limited applications as specified, without having any effect in the treatment of typhous infections produced by salmonellas. The bacteriological observations of the evacuations of infants fed with human milk, have led to the conclusion that the milk inhibits the development of the cultures of *Escheridia coli, Ebesthella typhosa,* and *Salmonella paratyphi A.*

It has also been observed that ass milk has lytic properties equivalent to human milk, being its best substitute and having the highest lytic activity over the specified organisms.

The content of lysozyme in ass milk was unknown, as the investigations on this agent had been limited to egg white.

Having determined the inhibiting and lytic activity of lysozyme, several processes for its purification and extraction were developed, but all limited to egg white, which showed the highest concentration of lysozyme.

Among the best known methods of purification of lysozyme from egg white, there is the fractioning of egg white with ammonium sulphate, which gives a concentration 20 to 30 times the activity of egg white. This process has been rejected as costly and unsafe.

The preparation of lysozyme by the absorption method was reported by Alderton, Ward and Fevold with an approximate absorption of lysozyme in special clays, such as bentonite, as high as 85 to 99 percent. This process offers the advantage of a high absorption of the lytic agent.

The process yielding the best results has been the purification of lysozyme by precipitation of egg white with cold acetone, dried in a vacuum over $P_2O_5$, resulting in a white powder representing 14 to 15 percent of the total weight on egg white, without loss of potency. The precipitation of lysozyme by flavianic acid, from 0.9 percent NaCl solutions with commercial colloidal iron and the treatment of egg white powder with alcohol solutions containing acetic acid, and repeated precipitations with diluted alcohol, are other methods of extraction of this lytic agent.

The clinical and bacteriological investigations have demonstrated without doubt, the potency of the lysozyme prepared by any of the above specified methods, and certain procedures have been established to determine the activity, mainly the highest dilution of lysozyme resulting in the complete lysis of the test organisms incubated up to 20 hours at 37°, taking the readings of the partial and complete lysis, at fixed intervals.

Therapeutic and clinical investigations have also demonstrated the limitations of lysozyme extracted from egg white by any of the specified methods. Thus, lysozyme from egg white have been successfully used in the treatment of certain infections, but they have not shown positive results in their application to the lysis of other organisms, of the Enterobacteriaceal family.

The complete and efficient lysis of said organisms, not obtained with lysozyme from egg white, has been obtained with lysozyme purified from ass milk, which have shown an activity over said bacteria, as high as egg white lysozyme over the specified coccus.

An object of this invention is to provide a process for the preparation of lysozyme from ass milk, which allows their utilization in the treatment of bacterial diseases by the lytic action on said bacteria.

Another object of this invention is to provide the means for the extraction of lysozyme from ass milk, for the lysis of bacteria "in vivo" of the type known as Salmonella, and other micro-organisms not attacked by the known lysozyme.

A further object of this invention is to provide a practical and low cost process, comprising a minimum of operations for the extraction of lysozyme from ass milk, purified for their solubilization in a saline solution.

A further object of this invention is to provide the means for the extraction of lysozyme from ass milk, with a potency over typhous bacilli, similar to the activity of known lysozyme over *Micrococcus lysodeikticus.*

A further object of this invention is to provide the means for the preparation of lysozyme from ass milk, with a yield comparable to the known processes applied to egg white.

With the above and other objects in view, our invention consists in the process for the purification of lysozyme from ass milk as disclosed in the following specifications, and then more particularly pointed out in the appended claims.

The process embodied in this invention essentially consists in the precipitation of fresh ass milk with four volumes of acetone, which is the critical amount of precipitant, settling the product at a temperature of less than five degrees centigrade, during twenty-four hours or more. Said precipitate is further washed with acetone and ether at a temperature of five degrees or less, beginning the purification of the product which is dried in a vacuum over $P_2O_5$.

The first step of the process results in a white colored product containing impurities of caseine, lactates and several salts having bacteriological properties which present a very low lytic activity.

The second step of the process according to this invention substantially consists in the purification of the product through the extraction of lysozyme with sixty percent alcohol, acidified with ten percent acetic acid. In the process for the extraction of lysozyme from egg white, fifty percent alcohol is used, this percentage of alcohol being specific for the process. The extracted volume is left at low temperatures and precipitated with alcohol, collecting the precipitate in a slightly alkaline solution slowly adding diluted sulphuric acid until a complete precipitation is obtained, and reducing the volume of any of the known means such as distillation, at high vacuum and low temperature.

The precipitation of lysozyme is obtained by the application of flavianic acid to the concentrate from the previous operations, obtaining a precipitate by centrifugation and washing with cold alcohol.

Due to the purification resulting from these operations, there is a greater activity in the lytic action of the product, which now is a yellowish powder.

The third step in the process consists of a further purification of the product by dilution in a weak alkaline solution, repeating the treatment with sulphuric acid, this time in the presence of flavianic acid.

The resulting precipitate is thoroughly washed with alcohol containing a few drops of ammonia, until the alcohol no longer has a yellow color, ending the washes with a cold alcohol and ether wash, to eliminate any trace of ammonia and speed the drying.

The final step in the process substantially comprises the purification of the product by vacuum dessication over $P_2O_5$, at a temperature lower than ten degrees centigrade.

A greater purification, comprising the crystallization of the product, may be obtained by the absorption of the product from the previous operations in bentonite.

The final dessication results in a product having the physical aspect of a slightly yellowish powder. Its chemical properties may be summarized specifying that the product is soluble in a saline solution, with a weak biuret positive reaction, and containing from 15 to 16 percent nitrogen, as determined by micro Kjeldahl.

The bacteriological potency of the lysozyme extracted from ass milk was determined considering its activity over *Micrococcus lysodeikticus* in a solution of NaCl, 10.9 percent, with an optical density type number eight of a suspension of barium sulphate, corresponding to a concentration of four thousand million organisms by cubic centimeter.

The yield from this process may be estimated as an average of 12 mg. of lysozyme from 30 grams of the first ass milk precipitate.

The lytic activity of the lysozyme extracted from ass milk according to this process, may be estimated over concentrations of *Micrococcus lysodeikticus*, as follows:

| Bacterial Suspension | Lysozyme, mg. | Time, minutes | Lysis |
|---|---|---|---|
| 1 cc | 0.5 | Instantaneous | Total. |
| 1 cc | 0.1 | 1.5 | Do. |
| 1 cc | 0.05 | 2.5 | Do. |
| 1 cc | | | No lysis in 24 hours. |

What we claim is:

1. The process of extracting lysozyme from ass milk which consists in effecting precipitation with four volumes of acetone, washing precipitate in acetone and ether, extracting lysozyme in solution of alcohol and acetic acid, collecting precipitate in alkaline solution containing dilute sulphuric acid, reducing volume of precipitate by distillation, purifying and concentrating precipitate in weak alkaline solution, repeating purifying and concentrating step of precipitate with addition of sulphuric acid in presence of flavianic acid, washing precipitate with alcohol containing ammonia, washing precipitate with cold alcohol and ether, and finally subjecting precipitate to vacuum dessication over $P_2O_5$ at less than ten degrees centigrade.

2. The process of extracting lysozyme from ass milk which consists in effecting precipitation with four volumes of acetone at a temperature of less than five degrees centigrade over a period of at least twenty-four hours, washing precipitate in acetone and ether, extracting lysozyme in solution of alcohol and acetic acid, collecting precipitate in alkaline solution containing dilute sulphuric acid, reducing volume of precipitate by distillation, purifying and concentrating precipitate in weak alkaline solution, repeating purifying and concentrating step of precipitate with addition of sulphuric acid in presence of flavianic acid, washing precipitate with alcohol containing ammonia, washing precipitate with cold alcohol and ether, and finally subjecting precipitate to vacuum dessication over $P_2O_5$ at less than ten degrees centigrade.

3. The process of extracting lysozymes from ass milk which consists in precipitating the milk with four volumes of acetone, washing the precipitate with acetone and ether, extracting the lysozymes with alcohol and acetic acid, collecting the precipitate in an alkaline solution by the addition of sulphuric acid until complete precipitation is obtained, reducing the volume by distillation, again collecting the precipitate in an alkaline solution with the addition of sulphuric acid in the presence of flavianic acid, washing the precipitate thus obtained with alcohol containing a small quantity of ammonia and with ether to eliminate any trace of ammonia and speed drying, and then purifying the product by vacuum dessication over $P_2O_5$.

4. The process of producing lysozymes which consists in precipitating ass milk with four volumes of acetone, settling the product at a temperature of less than 5° C. during at least 24 hours, washing the precipitate with acetone and ether at a temperature of at least 5° C., purifying the product by extracting the lysozymes with 60% alcohol acidified with 10% acetic acid, precipitating the product thus extracted with alcohol, collecting the precipitate in a slightly alkaline solution while slowly adding diluted sulphuric acid, reducing the volume by distillation at high vacuum and low temperature, diluting the product in a weak alkaline solution with sulphuric acid in the presence of flavianic acid, washing the resulting precipitate with alcohol containing a few drops of ammonia and then with cold alcohol and ether, and then subjecting the same to vacuum dessication over $P_2O_5$ at a temperature lower than minus 10° C.

5. The process of producing lysozymes which consists in precipitating ass milk with four volumes of acetone, washing the precipitate with acetone and ether at a temperature of at least 5° C., extracting the lysozymes with 60% alcohol acidified with 10% acetic acid, precipitating the product with alcohol, collecting the precipitate in a slightly alkaline solution to which dilute sulphuric acid is added, diluting the product in a weak alkaline solution with sulphuric acid in the presence of flavianic acid, washing the resulting precipitate with alcohol containing a few drops of ammonia and then with cold alcohol and ether, then subjecting the same to vacuum dessication over $P_2O_5$ at a temperature lower than minus 10° C., and then crystalizing the product by absorption in special clays equivalent to bentonite.

DAGOBERTO MOLINA POLO.
ALFONSO GUILLERMO ALARCON.

REFERENCES CITED

The following references are of record in the file of this patent:

UNITED STATES PATENTS

| Number | Name | Date |
|---|---|---|
| 2,442,452 | Alderton | June 1, 1948 |

OTHER REFERENCES

Jour. Soc. of Chemical Industry (London), 1932, vol. 51, page 912, by Morgan et al.